United States Patent [19]
Nakao et al.

[11] Patent Number: 5,791,630
[45] Date of Patent: Aug. 11, 1998

[54] FLOW CONTROL VALVE

[75] Inventors: Kenji Nakao; Takeshi Sugiyama; Teruhiko Moriguchi, all of Tokyo, Japan

[73] Assignee: Mitsubishi Denki Kabushiki Kaisha, Tokyo, Japan

[21] Appl. No.: 732,853

[22] Filed: Oct. 15, 1996

[30] Foreign Application Priority Data

May 30, 1996 [JP] Japan ................... 8-136834

[51] Int. Cl.$^6$ ........................... F16K 31/02
[52] U.S. Cl. .............. 251/129.19; 251/129.15; 251/85
[58] Field of Search ........... 251/129.19, 129.07, 251/85, 129.18, 129.15

[56] References Cited

U.S. PATENT DOCUMENTS

| 4,813,647 | 3/1989 | Yagi et al. ............. 251/129.19 |
| 5,139,227 | 8/1992 | Sumida et al. |
| 5,217,036 | 6/1993 | Maier .................. 251/129.15 |

FOREIGN PATENT DOCUMENTS 4-39475  2/1992  Japan .

*Primary Examiner*—Denise L. Ferensic
*Assistant Examiner*—John Ball
*Attorney, Agent, or Firm*—Sughrue, Mion, Zinn, Macpeak & Seas, PLLC

[57] ABSTRACT

A movable core (71) is formed to have such an outer shape that the surface area of the movable core opposite to a yoke (51) is reduced in the region where the stop position, which is determined by balancing between the electromagnetic attracting force and a return spring (70), exceeds a certain position. Thus, when the movable core (71) is stopped in the certain position, the outer circumference surface of a larger-diameter portion of the movable core (71) faces the yoke and the magnetic flux passes through the magnetic passage as per designed. But when the movable core (71) is stopped beyond the certain position, both large- and small-diameter portions of the movable core (71) face the yoke (51) and the outer circumference area of the larger-diameter portion of the movable core (71) which faces the yoke (51) is reduced. Therefore, the magnetic flux becomes hard to pass through the magnetic passage and the electromagnetic attracting force is reduced. As a result, the movable core is less attracted to come close to or abut against the stationary core even when an overcurrent is applied to a coil, and deterioration in control performance possibly caused by residual magnetism is suppressed.

13 Claims, 6 Drawing Sheets

FLOW CONTROL VALVE

BACKGROUND OF THE INVENTION

1. Field of the Invention

This invention relates to a flow control valve for controlling the flow rate of a fluid in response to an electric signal.

2. Description of the Related Art

In an internal combustion engine, for example, an auxiliary air passage is provided near a throttle valve of an inlet pipe and a flow control valve for controlling the flow rate of air in response to a current supplied thereto is disposed in the auxiliary air passage. With the flow control valve opening and closing the auxiliary air passage, the amount of inlet air is adjusted depending on the load of an internal combustion engine to control the idling rotational speed.

FIG. 5 is a longitudinal sectional view showing a prior art flow control valve disclosed in, e.g., Japanese Patent Laid-Open No. 4-39475.

In FIG. 5, the flow control valve comprises a solenoid device 10 and a valve body 30.

The construction of the solenoid device 10 will be first described.

An exciting coil unit 12 is disposed inside a cover 11. The exciting coil unit 12 is formed by placing a coil 14 wound over a cylindrical bobbin 13 in a cylindrical case 15, and pouring a filling resin material 16 to be filled in the case 15. A lead 17 is led out from the coil 14 upward, as viewed in FIG. 5, through an insulating bushing 18 while penetrating a fixture plate 20 and a cover 17 described later. Mentioned above is the construction of the exciting coil unit 12.

A cylindrical sleeve 19 made of non-magnetic material is fitted to an inner circumference of the exciting coil unit 12, and a stationary core 21 fixedly supported by the fixture plate 20 is disposed in the sleeve 19. The sleeve 19 is supported at its lower end, as viewed in FIG. 5, by the cover 11 through a guide member 22. Further, an annular rib 23 is provided on the underside of the guide member 22.

A movable core 24 is axially movably arranged in the sleeve 19 in facing relation to the stationary core 21 with an axial air gap left between both the cores.

The movable core 24 has a smaller-diameter portion 25 integrally formed at its end, and a communicating portion 26 is formed to penetrate the movable core 24. A return spring 28 is supported by a pin-shaped spring holder 27 provided in a central portion of the stationary core 21 and is inserted between the stationary core 21 and the movable core 24 in a compressed state. Therefore, the movable core 24 is always pressed by the biasing force of the return spring 28 in a direction (downward as viewed in FIG. 5) opposite to the electromagnetic attracting force generated by the exciting coil unit 12 or the coil 14.

Thus, the solenoid device 10 is constructed of the above-mentioned components from the cover 11 to the return spring 28.

The construction of the valve body 30 will be described below.

A housing 31 has an air inlet 32 and an air outlet 33 formed therein. A valve seat 34 is fitted in the housing 31 near its upper end in an air-tight manner with respect to an inner wall of the housing 31. An air passing aperture 35 is formed at the center of the valve seat 34 to communicate the air inlet 32 and the air outlet 33 with each other. The air passing aperture 35 has a peripheral edge which is formed into a tapered shape and with which a poppet valve body 36 comes into pressure contact. The end of the poppet valve body 36, which comes into pressure contact with the peripheral edge of the air passing aperture 35, is formed to have a spherical surface. The poppet valve body 36 is fitted over and supported by the smaller-diameter portion 25 of the movable core 24 to be slidable axially (in the vertical direction in FIG. 5).

The poppet valve body 36 is prevented from slipping off from the smaller-diameter portion 25 by a stopper 37 fixed to the distal end of the smaller-diameter portion 25. Though not shown, a tetrafluoroethylene resin is coated over an outer circumference of the smaller-diameter portion 25 so that the poppet valve body 36 can smoothly slide over the smaller-diameter portion 25. A spring 38 is inserted between the poppet valve body 36 and the movable core 24 in a compressed state. Thus, the poppet valve body 36 is pressed by the return spring 28 through the spring 38 into pressure contact with the valve seat 34, thereby air-tightly closing the air passing aperture 35. The compressive load of the spring 38 exerted when it is fitted in place is selected to be greater than that of the return spring 28. Therefore, the pressure contact load between the poppet valve body 36 and the stopper 37 exerted by the spring 38 is greater than that between the poppet valve body 36 and the valve seat 34 exerted by the return spring 28. As a result, there occurs no gap between the poppet valve body 36 and the stopper 37 when the valve is fully closed.

Further, an adjusting screw 39 is screwed through a bottom wall of the housing 31 as illustrated. A spring 41 is interposed between the stopper 37 and a spring holder 40 supported at the distal end of the adjusting screw 39. The spring constant of the spring 41 is selected to be smaller than that of the return spring 28 and the biasing force thereof is set by rotating the adjusting screw 39 to adjust the position of the spring holder 40. The biasing force of the return spring 28 is offset by adjusting the biasing force of the spring 41 to thereby set the minimum electromagnetic attracting force that is required to attract the movable core 24 toward the stationary core 21.

The operation of the flow control valve will be described below.

When a certain current is supplied to the coil 14 via the lead 17, the coil 14 generates an electromagnetic attracting force. This electromagnetic attracting force causes the movable core 24 to slide toward the stationary core 21 against the resilient force of the return spring 28 while being guided by the sleeve 19. Then, the movable core 24 is stopped at a position where the electromagnetic attracting force generated at that time is balanced by the resilient force of the return spring 28. In other words, the stroke of the movable core 24 is proportional to the electromagnetic attracting force.

The electromagnetic attracting force generated varies by controlling the current supplied to the coil 14. In the illustrated prior art, the electromagnetic attracting force is changed by controlling the duty ratio of a certain pulse current.

The operation will now be described with reference to a characteristic graph of FIG. 6.

When no current is supplied to the coil 14, the biasing force of the return spring 28 overcomes the biasing force of the spring 41, causing the poppet valve body 36 to be pressed against the valve seat 34. Thus, the poppet valve body 36 comes into pressure contact with the valve seat 34, whereby the air passing aperture 35 is closed to disconnect the air inlet 32 and the air outlet 33 from each other.

As the duty factor DF of the pulse current supplied to the coil 14 is increased from zero, the electromagnetic attracting force acting on the movable core 24 overcomes the biasing force of the return spring 28 (strictly speaking, the difference in resilient force between the return spring 28 and the spring 41) at a certain point, whereupon the movable core 24 starts moving upward as viewed in FIG. 5 and the poppet valve body 36 starts separating from the valve seat 34. That point is given by a point A (duty factor DF1) on a straight line U shown in FIG. 6. Stated otherwise, the air inlet 32 and the air outlet 33 are communicated with each other, allowing air to flow from arrow IN toward arrow OUT.

With a further increase in the duty factor, the electromagnetic attracting force acting on the movable core 24 is increased correspondingly and, therefore, the movable core 24 is further moved upward as viewed in FIG. 5. Then, the movable core 24 is stopped at a position where the electromagnetic attracting force generated at that time is balanced by the reactive biasing force of the return spring 28 (strictly speaking, the difference in resilient force between the return spring 28 and the spring 41). In this way, the gap distance from the valve seat 34 to the poppet valve body 36 is determined depending on the duty factor of the pulse current supplied to the coil 14. The flow rate of air passing the valve is determined depending on an opening degree of the poppet valve body 36.

The foregoing flow control valve is controlled as follows. A controller (not shown) detects the idling rotational speed of an engine and controls the duty factor of the pulse current supplied to the coil 14 so that the idling rotational speed is held at a predetermined value. When the electric load, the air conditioner load, etc. are additionally applied, the controller also controls the duty factor DF so as to prevent a reduction in the rotational speed and achieve a target rotational speed.

In the prior art flow control valve for an internal combustion engine shown in FIG. 5, however, when an overcurrent is supplied to the coil 14, the movable core 24 may move toward the stationary core 21 in excess of a predetermined amount (i.e., the stroke resulted when supplying a rated current) to such an extent that the movable core 24 comes close to or abut against the stationary core 21. This condition leads to a risk of deteriorating reliability. Furthermore, if the movable core 24 comes close to the stationary core 21, the movable core 24 remains lodged on the side of the stationary core 21 by the action of residual magnetism, resulting in a problem that the movable core 24 is delayed in its response to the control current.

SUMMARY OF THE INVENTION

This invention has been accomplished with a view of solving the problems as set forth above, and its object is to provide a flow control valve with which a movable core is less attracted to come close to or abut against a stationary core, and which increases stability in control and improve reliability in operation.

In order to achieve the above object, according to one aspect of the present invention, there is provided a flow control valve which comprises an electromagnetic coil for generating a magnetic field when supplied with a current, a stationary core placed in the electromagnetic coil, a yoke disposed outside the electromagnetic coil so as to cover the electromagnetic coil and making up a magnetic circuit in cooperation with the stationary core, a movable core slidably disposed in a cylindrical member in such a manner as able to move toward the stationary core with the electromagnetic attracting force generated by the electromagnetic coil, a return spring disposed between the stationary core and the movable core for biasing the movable core in a direction opposite to the electromagnetic attracting force, a flow control valve body having an air inlet passage and an air outlet passage formed therein, a valve seat disposed in the flow control valve body so as to define the air inlet passage and the air outlet passage and having an air passing aperture formed therein to communicate the air inlet passage and the air outlet passage with each other, a valve slidably fitted over the movable core so as to contact with and separate from the air passing aperture for opening and closing an air flow between the air inlet passage and the air outlet passage, a spring for biasing the valve in a direction toward the valve seat relative to the movable core, and a stopper for restricting the amount of movement of the valve in the direction toward the valve seat, wherein the magnetic circuit is formed such that the electromagnetic attracting force is reduced in the region where the stop position of the movable core, which is determined by balancing between the electromagnetic attracting force and the urging force of the return spring, exceeds a certain position.

BRIEF DESCRIPTION OF THE DRAWINGS

FIGS. 3(A) and 3(B) are sectional views for explaining the operation of the flow control valve according to Embodiment 1 of the present invention, in which: FIG. 3(A) shows a state where a rated current is applied and FIG. 3(B) shows a state where an overcurrent is applied.

DESCRIPTION OF THE PREFERRED EMBODIMENTS

Preferred embodiments of the present invention will be described hereinafter with reference to the drawings.
Embodiment 1

Figure 1:
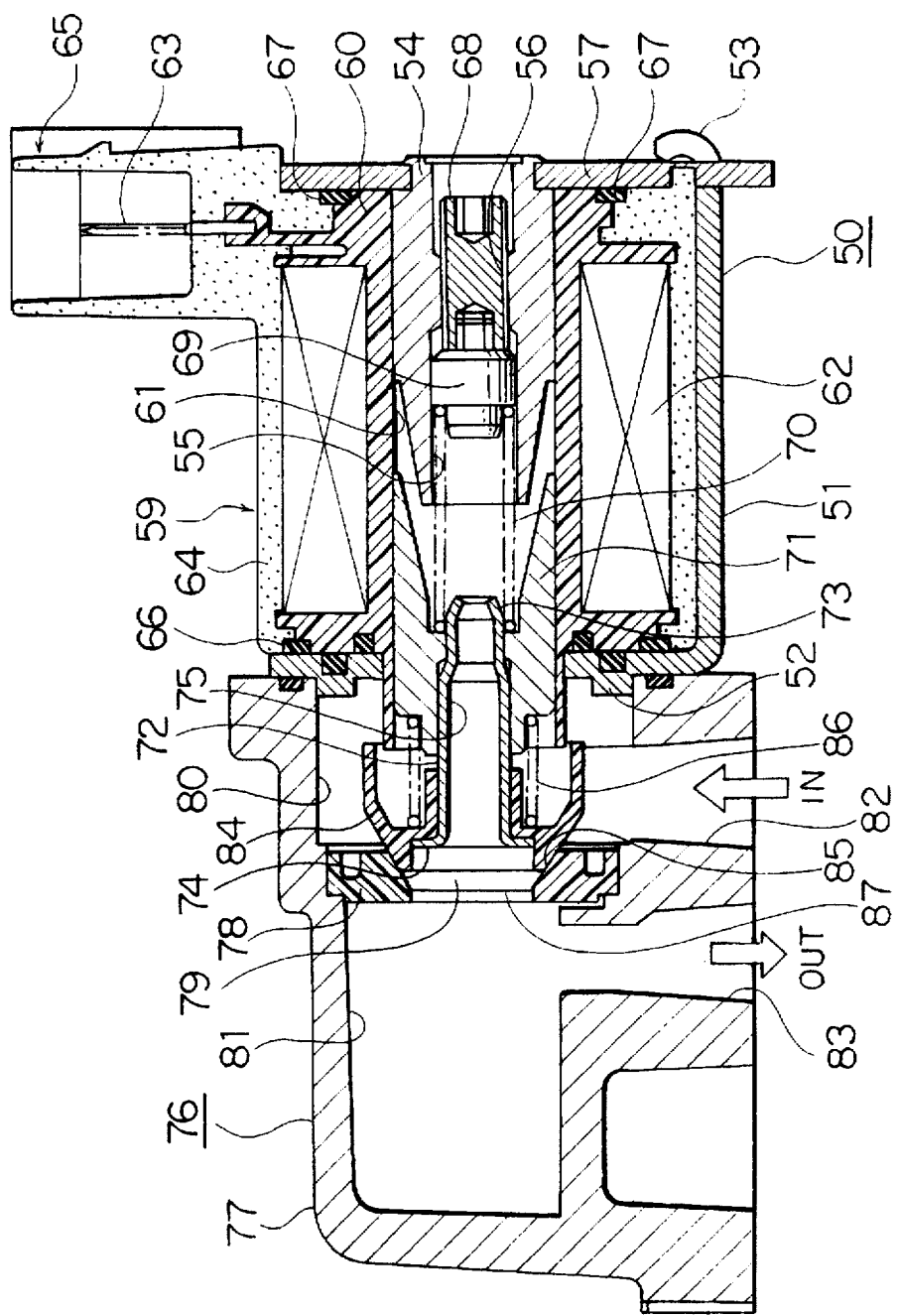
FIG. 1 is a longitudinal sectional view showing an axial cross-section of a flow control valve according to Embodiment 1 of the present invention.
Figure 2:
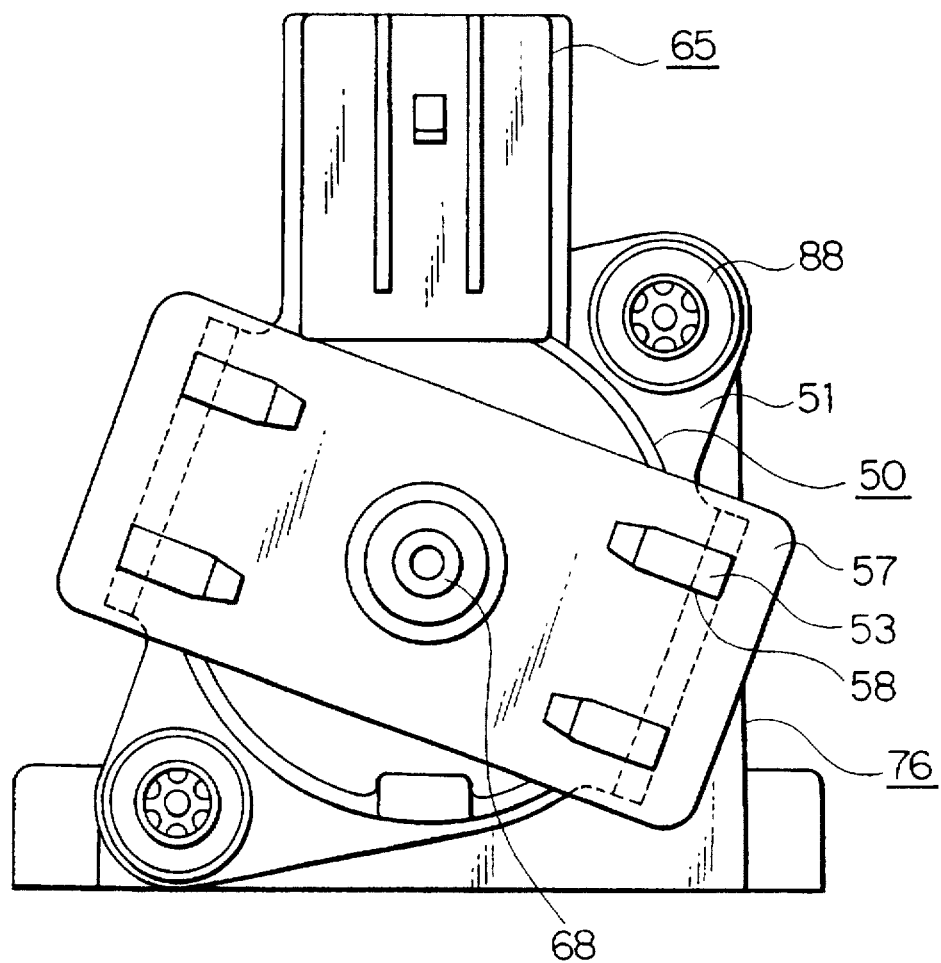
FIG. 2 is a side view of the flow control valve according to Embodiment 1 of the present invention.
Figure 3A:
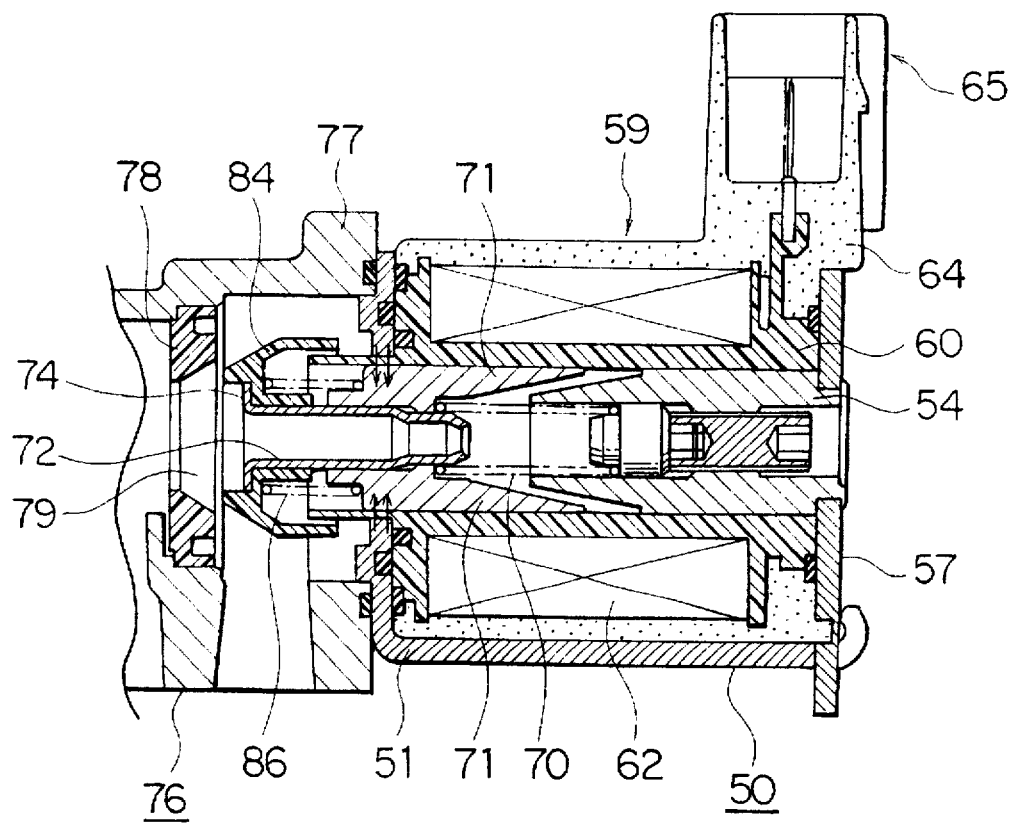
Figure 3B:
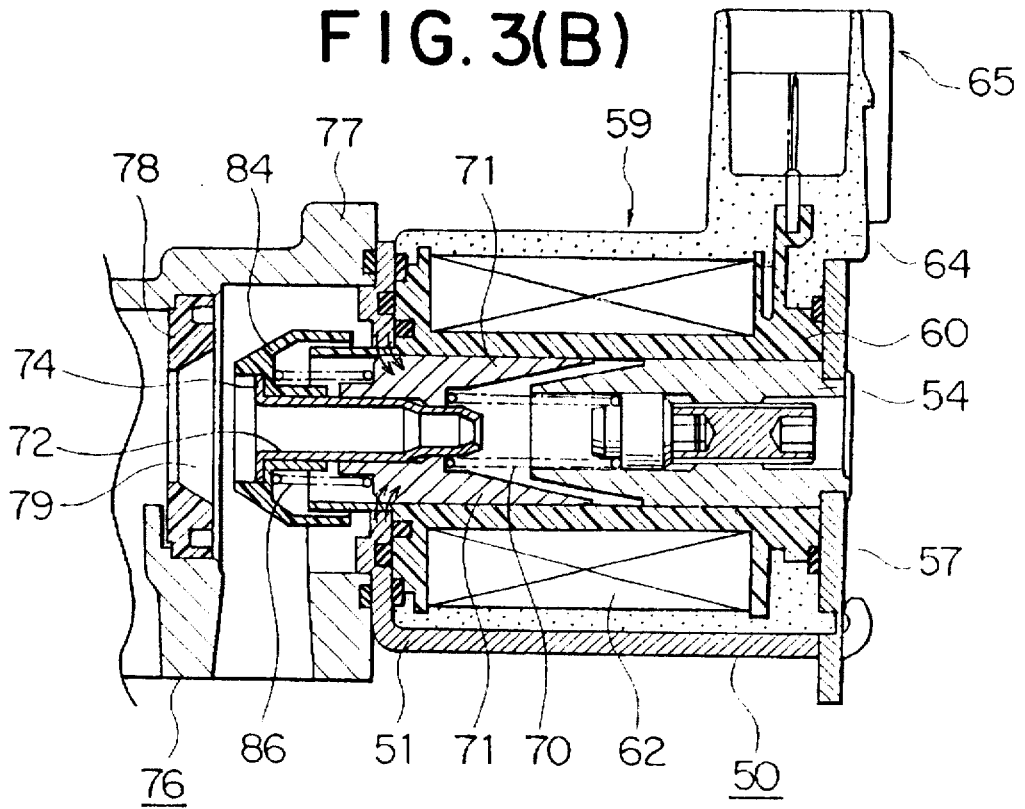
Figure 4:
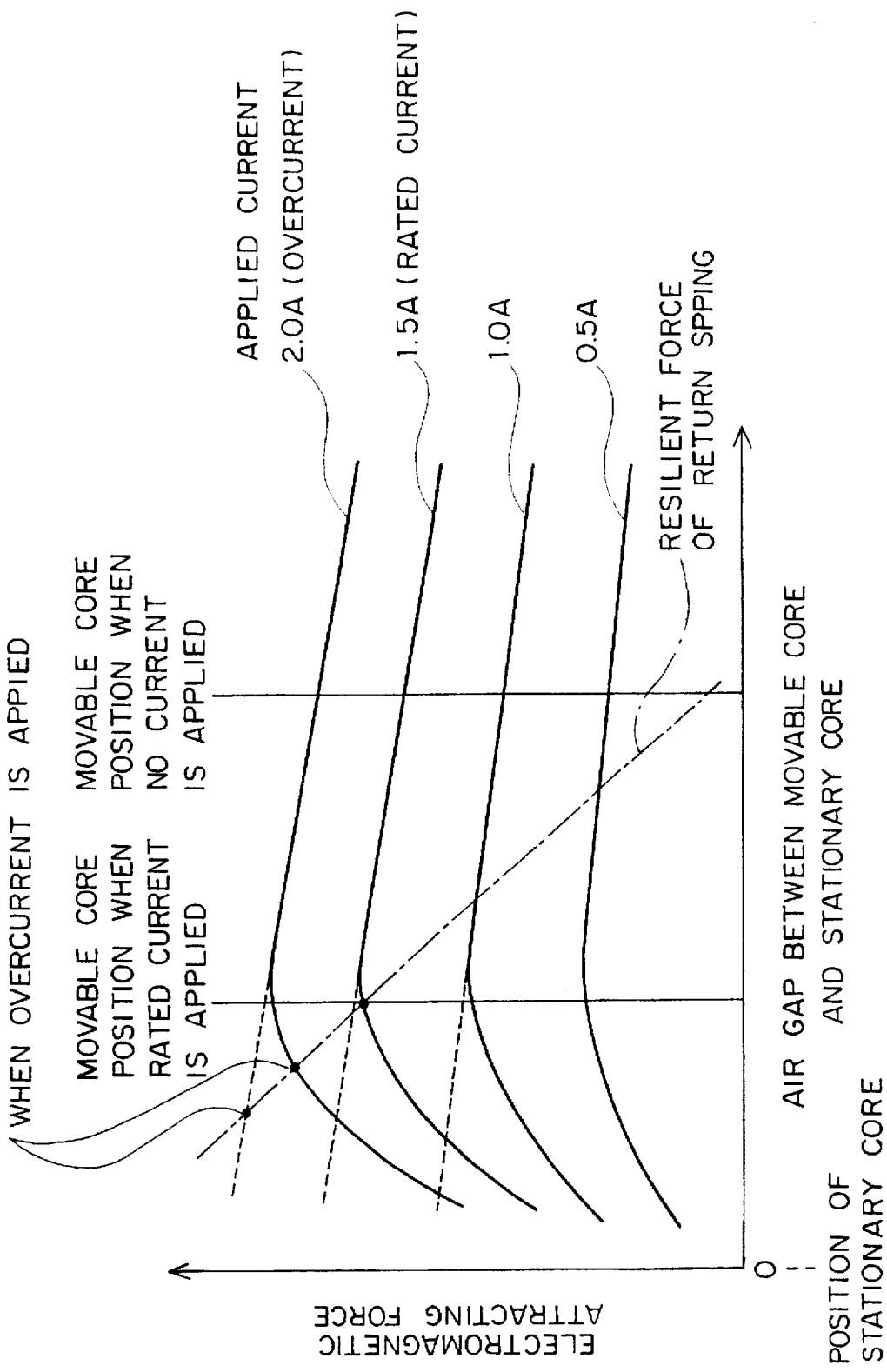
FIG. 4 is a characteristic graph of electromagnetic attracting forces generated in the prior art and Embodiment 1.

FIG. 1 is a longitudinal sectional view showing an axial cross-section of a flow control valve according to Embodiment 1 of the present invention. FIG. 2 is a side view of the flow control valve according to Embodiment 1 of the present invention. FIGS. 3(A) and 3(B) are sectional views for explaining the operation of the flow control valve according to Embodiment 1 of the present invention, in which: FIG. 3(A) shows a state where a rated current is applied and FIG. 3(B) shows a state where an overcurrent is applied, and FIG. 4 is a characteristic graph of electromagnetic attracting forces generated in the prior art and Embodiment 1.

Referring to FIGS. 1 and 2, a solenoid device 50 is constructed as follows. A yoke 51 is formed by bending a thick steel plate into a channel-like shape as a whole, including projections 52 and fingers 53. A stationary core 54 has a hollow portion 55 and a threaded portion 56 formed therein along its axis. One end of the stationary core 54 nearer to a movable core 71 has an outer circumference formed into a tapered shape, and the other end thereof is fitted to a fixture plate 57 and secured in place by caulking.

Also, rectangular holes 58 are formed in the fixture plate 57. The fixture plate 57 and the yoke 51 are secured to each other by inserting the fingers 53 of the yoke 51 into the respective holes 58 and bending the fingers 53. Thus, a magnetic circuit of the solenoid device 50 is constructed by the fixture plate 57 and the stationary core 54.

An exciting coil unit 59 is constructed as follows. A bobbin 60 has a through hole 61 axially penetrating it. The through hole 61 is fitted over the outer circumference of the stationary core 54 and serves as a guide for a movable core 71 described later. A coil 62 is wound over an outer circumference of the bobbin 60. A connecting conductor 63 is led out of the coil 62. The coil 62 and the connecting conductor 63 are molded by a resin material 64 into a one-piece structure with a terminal portion 65 formed at one end. Additionally, the bobbin 60 constitutes a cylindrical member in which the movable core 71 is slidably disposed.

The exciting coil unit 59 is fixedly held between the yoke 51 and the fixture plate 57 in an axially sandwiched relation. Circular rubber-made packings 66, 67 are interposed respectively at the boundary between the bobbin 60 and the resin material 64 in the exciting coil unit 59 and between the yoke 51 and the fixture plate 57 to prevent water, etc. from entering the coil 62 portion and seal off the unit 59 space against an inlet side space 80 (described later) and the outside.

An adjusting screw 68 is screwed into the threaded portion 56 of the stationary core 54. Hexagonal recesses are formed at both ends of the adjusting screw 68 and the threads on an outer circumference of the adjusting screw 68 are mechanically processed to keep air tightness between the space of the through hole 61 and the open air. A spring holder 69 is axially movably inserted in the hollow space 55 of the stationary core 54. The spring holder 69 is provided at one end with a hexagonal projection which is fitted to the hexagonal recess of the adjusting screw 68 so that the spring holder 69 is prevented from freely rotating with respect to the adjusting screw 68. One end of a coil-shaped return spring 70 is press fitted to the other end of the spring holder 69.

A hollow cylindrical movable core 71 is inserted into the through hole 61 of the bobbin 60 in an axially slidable manner in facing relation to the stationary core 54, and is always pressed by the return spring 70 to the left as viewed in FIG. 1. A pipe 72 having a communicating hole 75 formed therethrough is fixedly press fitted in a hollow portion of the movable core 71. The other end of the return spring 70 is press fitted and held over a penetrating portion 73 of the pipe 72 which is projecting from the hollow portion of the movable core 71. The distal end of the pipe 72 is bent outward in the radial direction to form a flange 74 serving as a stopper.

The construction of a valve body 76 will be described below.

A housing 77 is made of aluminum by die casting. A valve seat 78 having a tapered (conical) air passing aperture 79 formed in its central portion is close fitted within the housing 77 in an air-tight manner. An inner space of the housing 77 is partitioned by the valve seat 78 serving as a control valve seat into an inlet side space 80 and an outlet side space 81. An air inlet 82 is provided to be communicated with the inlet side space 80 and an air outlet 83 is provided to be communicated with the outlet side space 81. The inlet side space 80 and the air inlet 82 jointly make up an air inlet passage, whereas the outlet side space 81 and the air outlet 83 jointly make up an air outlet passage.

A poppet valve body 84 serving as a valve includes an abutting portion 85 of which part coming into pressure contact with a peripheral edge of the air passing aperture 79 is formed to have a spherical surface. The poppet valve body 84 is fitted over the pipe 72 in an axially slidable manner which is fixedly fitted to the movable core 71. A coil-shaped spring 86 is inserted between the poppet valve body 84 and the movable core 71 in a compressed state to press the poppet valve body 84 to the left as viewed in FIG. 1. Thus, the poppet valve body 84 is pressed by the return spring 70 through the spring 86 into pressure contact with the valve seat 78, thereby air-tightly closing the air passing aperture 79. Also, the poppet valve body 84 pressed by the biasing force of the spring 86 bumps against the flange 74 so that further movement of the poppet valve body 84 is restricted.

Additionally, the diameter of the circle along which the abutting portion 85 comes into pressure contact with the peripheral edge of the air passing aperture 79 is set substantially equal to the outer diameter of the movable core 71.

By rotating the adjusting screw 68, the distance by which the return spring 70 is compressed in a normal state is adjusted beforehand so that the force of pressing the poppet valve body 84 against the valve seat 78 becomes a predetermined value. The compressive load of the spring 86 exerted when it is fitted in place is selected to be greater than that of the return spring 70. Therefore, the pressure contact load between the poppet valve body 84 and the flange 74 of the pipe 72 exerted by the spring 86 is greater than that between the poppet valve body 84 and the valve seat 78 exerted by the return spring 70. As a result, there occurs no gap between the poppet valve body 84 and the flange 74 when the valve is fully closed.

The valve body 76 having the above-mentioned structure is fixedly attached to the yoke 51 by screws 88, thereby providing a flow control valve constructed of the valve body 76 and the solenoid device 50 joined together.

Here, the valve seat 78 and the poppet valve body 84 can be formed of, e.g., polybutylenetelephtalate.

The operation of the flow control valve will now be described.

When no current is supplied to the coil 62, the movable core 71 is pressed by the return spring 70 to the left in FIG. 1. The poppet valve body 84 is also pressed to the left through the spring 86, causing the abutting portion 85 to come into pressure contact with the peripheral edge of the air passing aperture 79 so that the passage of air through the air passing aperture 79 is shut off. Thus, there is no air flow between the air inlet 82 and the air outlet 83.

When a certain current, i.e., a pulse current of a predetermined duty factor, is supplied to the coil 62, an electromagnetic attracting force generates between the stationary core 54 and the movable core 71 to attract the movable core 71 to the right in FIG. 1. The magnitude of the attracting force generated is proportional to the duty factor of the current supplied to the coil 62, and the movable core 71 is stopped at a position where the electromagnetic attracting force is balanced by the reactive urging force of the return spring 70.

Figure 6:
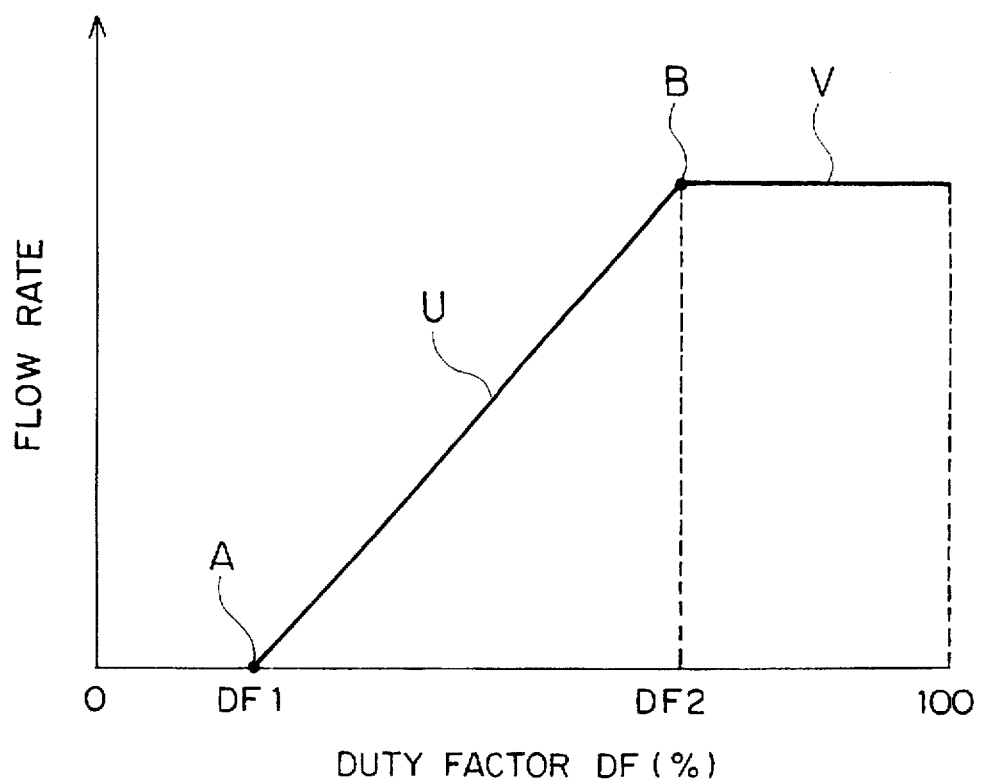
FIG. 6 is a characteristic graph for explaining the operation of the prior art flow control valve.

Depending on the amount by which the movable core 71 is moved, the poppet valve body 84 moves away from the valve seat 78 to establish communication between the air inlet 82 and the air outlet 83. More specifically, referring to FIG. 6, when the duty factor of the pulse current supplied to the coil 62 exceeds DF1, the poppet valve body 84 starts separating from the valve seat 78. After that, the flow rate of air increases with an increase in the duty factor DF, as indicated by the straight line U in FIG. 6. When the movable core 71 is further moved to such an extent that the passage area defined between the abutting portion 85 and the peripheral edge of the air passing aperture 79 is larger than the area of a minimum diameter portion 87 of the air passing aperture 79, the flow rate of air passing the valve is restricted by the minimum diameter portion 87 of the air passing aperture 79 and becomes constant as indicated by V in FIG. 6. Then, at the duty factor of 100%, the constant flow rate V is kept and the movable core 71 is stopped at a certain position where the electromagnetic attracting force is balanced by the reactive biasing force of the return spring 70, as stated above.

The case where a current in excess of the rated value is applied will be described below with reference to FIGS. 3(A), 3(B) and 4.

FIG. 3(A) shows a position where the movable core 71 is stopped when a rated current with the duty factor of 100% is applied, and FIG. 3(B) shows a state where the movable core 71 has moved closer to the stationary core 54 beyond the stop position shown in FIG. 3(A)

When the movable core 71 is in the stop position shown in FIG. 3(A), the outer circumference of a larger-diameter portion of the movable core 71 faces the yoke 51 and the magnetic flux passes through the magnetic passage as shown by arrows in the figure.

On the other hand, in the stop position of FIG. 3(B), both large- and small-diameter portions of the movable core 71 face the yoke 51. Accordingly, the outer circumference area of the larger-diameter portion of the movable core 71 which faces the yoke 51 is reduced and the magnetic flux becomes hard to pass through the magnetic passage. In this case, while an air gap between the movable core 71 and the stationary core 54 is reduced, the magnetic passage is restricted at the surface of the yoke 51 opposite to the movable core 71. Thus, the electromagnetic attracting force is diminished due to a reduction in the area of the surface of the movable core 71 opposite to the yoke 51.

As shown in FIG. 4, comparing to attracting force characteristics (dotted lines) of the prior art flow control valve, the flow control valve of Embodiment 1 provides attracting force characteristics (solid lines) as follows.

The attracting force generated when applying a certain current with the duty factor of 100% is gradually reduced in the region exceeding a certain position. Also, the attracting force is reduced at a higher rate as the current value increases. This means that the movable core is surely less attracted to move in that region even when the applied current increases beyond the rated value.

Stated otherwise, according to Embodiment 1, the magnetic circuit is formed such that the electromagnetic attracting force generated between the stationary core 54 and the movable core 71 is reduced in the region where the stop position of the movable core 71, which is determined by balancing between the electromagnetic attracting force and the return spring 70, exceeds a certain position, i.e., when an overcurrent in excess of the rated current is supplied to the coil 62. Therefore, even with an overcurrent in excess of the rated current supplied to the coil 62, the electromagnetic attracting force acting on the movable core 71 is diminished and the movable core 71 is less easily moved toward the stationary core 54.

Accordingly, the movable core 71 will not move toward the stationary core 54 in excess of a predetermined amount (i.e., the stroke resulted when supplying a rated current) to such an extent that the movable core 71 comes close to or abuts against the stationary core 54. Reliability in the operation is thereby improved.

Further, since the movable core 71 does not come close to the stationary core 54, the occurrence of residual magnetism between the movable core 71 and the stationary core 54 is suppressed. Therefore, the movable core 71 will not remain lodged on the side of the stationary core 54, but can move promptly in response to the control current. This improves stability in control of the flow control valve.

In addition, the air passing aperture 79 of the valve seat 78 is formed to have a tapered (conical) peripheral edge and the abutting portion 85 of the poppet valve body 84 is formed to have a spherical surface. Therefore, even if the movable core 54 sliding while being guided by a circumferential wall of the through hole 61 of the bobbin 60 is slightly inclined in the axial direction, the abutting portion 85 comes into pressure contact with the peripheral edge of the air passing aperture 79 along a circle of a predetermined diameter. It is thus possible to absorb an inclination of the movable core 54 and ensure a positive sealing ability.

Moreover, the spring 86 is disposed between the poppet valve body 84 and the movable core 71 in a compressed state. Accordingly, repellent forces produced by collisions upon seating or separating of the poppet valve body 84 due to minute vibrations caused under duty control are absorbed by the spring 86 biasing the poppet valve body 84. As a result, positive sealing is ensured when the duty factor is zero.

Also, the diameter of the circle along which the abutting portion 85 comes into pressure contact with the peripheral edge of the air passing aperture 79 is set substantially equal to the outer diameter of the movable core 71, and the air gap between the stationary core 54 and the movable core 71 is communicated with the outlet side space 81 through the communicating hole 75 of the pipe 72. Accordingly, forces acting on both ends of the movable core 71 from the left and right sides are balanced through the communicating hole 75, and hence the movable core 71 can be maintained in a stable state and smoothly moved for the opening and closing operation.

Finally, since the adjusting screw 68 is associated with the stationary core 54 so that the compressive load of the return spring 70 in its initial state is adjustable by the screw 68, the spring 40 employed in the prior art valve can be dispensed with and the valve construction is simplified correspondingly.

It is to be noted that, also in Embodiment 1, a film having the small coefficient of friction, such as made of a tetrafluoroethylene resin, may be coated over sliding portions of the poppet valve body 84 and the pipe 72. This is advantageous in reducing friction forces produced between the sliding portions and suppressing the occurrence of worn dust. Further, since a reduction in the friction forces enables a sliding clearance to be set smaller, it is possible to block minute foreign matters from entering the sliding portions and prevent a failure in operation possibly caused by intrusion of foreign matters. Similar advantages as with the above case can also be obtained by coating a film having the small coefficient of friction over sliding portions of the movable core 71 and the bobbin 60.

Figure 5:
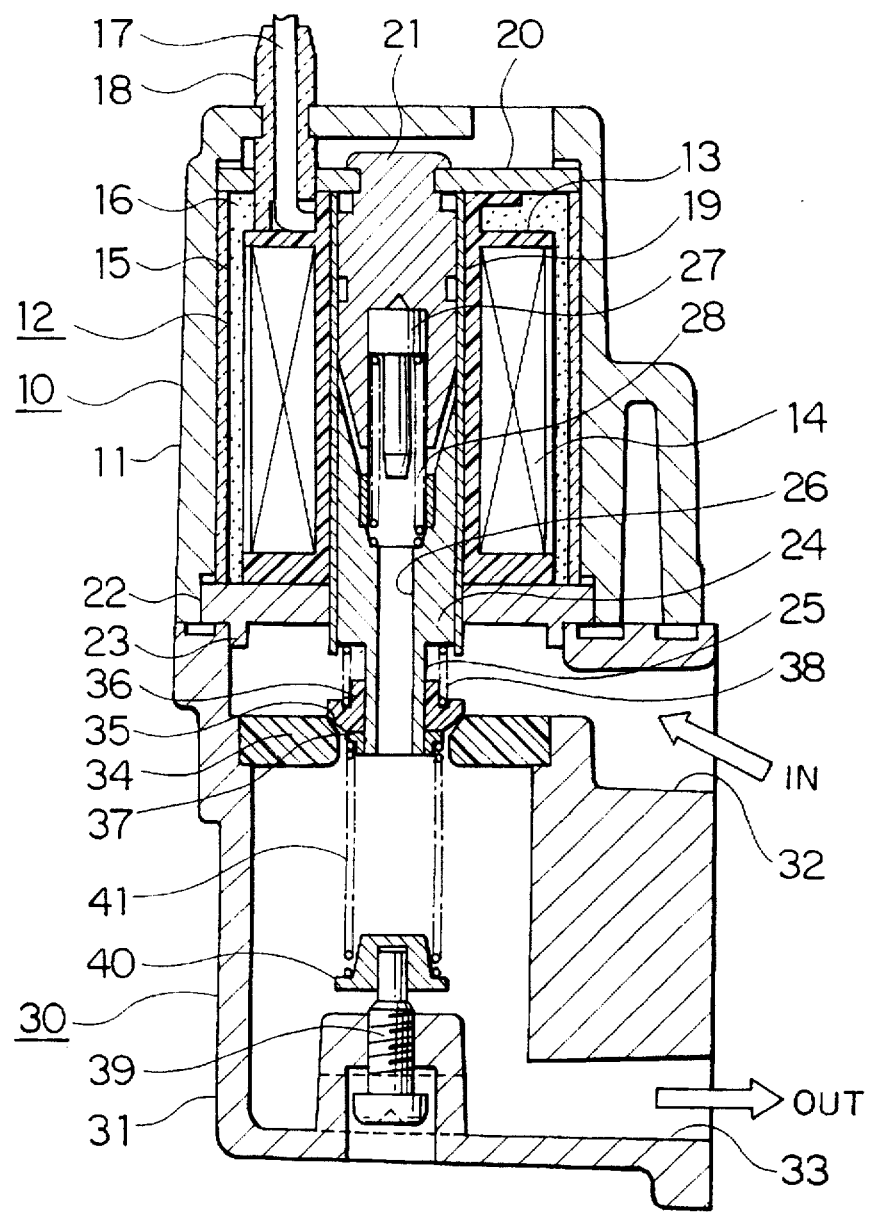
FIG. 5 is a longitudinal sectional view of a prior art flow control valve.

In Embodiment 1, the pipe 72 is fixed to the movable core 71 and the poppet valve body 84 is slidably fitted over the pipe 72. However, instead of the pipe 72, the movable core 71 may be formed to have a smaller-diameter portion and the poppet valve body 84 may be slidably fitted over the smaller-diameter portion, as shown in FIG. 5. In this case, the pipe 72 can be dispensed with and the valve construction is simplified correspondingly.

While, in Embodiment 1, the movable core 71 is slidably disposed in the through hole 61 of the bobbin 60, a cylindrical sleeve made of non-magnetic material may be fitted into the through hole 61 of the bobbin 60 and the movable core 71 may be slidably disposed in the sleeve.

According to one aspect of the present invention, the magnetic circuit is formed such that the electromagnetic attracting force is reduced in the region where the stop position of the movable core, which is determined by balancing between the electromagnetic attracting force and the biasing force of the return spring, exceeds a certain position. Therefore, a flow control valve is achieved which makes it hard for the movable core to come close to or abut against the stationary core when an overcurrent is applied to the coil, which can suppress deterioration in control performance possibly caused by residual magnetism when the movable core comes close to the stationary core, and which can ensure high reliability permanently.

According to another aspect of the present invention, the movable core is formed to have such an outer shape that the surface area of the movable core opposite to the yoke is reduced in the region where the stop position of the movable core exceeds the certain position. Therefore, the magnetic circuit capable of reducing the electromagnetic attracting force when the stop position of the movable core exceeds the certain position, can be simply formed.

According to still another aspect of the present invention, the movable core is in the form of a hollow cylinder, a hollow pipe is fitted to a hollow portion of the movable core in such a manner as to extend toward the side of a flow control valve body, a valve is slidably fitted over the pipe, and a stopper is provided at the distal end of the pipe. Such arrangement balances pressures acting on both ends of the movable core, increase stability in operation and simplifies the valve construction.

According to still another aspect of the present invention, the movable core has a smaller-diameter portion formed integrally with its end on the side of the flow control valve body, a through hole is formed to penetrate the movable core in the axial direction, a valve is slidably fitted over the smaller-diameter portion, and a stopper is provided at the distal end of the smaller-diameter portion. Therefore, in addition to similar advantages as with the above aspect, the pipe can be dispensed with and the valve construction is further simplified.

What is claimed is:

1. A flow control valve comprising:
    an electromagnetic coil for generating a magnetic field when supplied with a current;
    a stationary core placed in said electromagnetic coil;
    a yoke disposed outside said electromagnetic coil so as to cover said electromagnetic coil and make up a magnetic circuit in cooperation with said stationary core;
    a movable core slidably disposed in a cylindrical member in such a manner as to be able to move toward said stationary core upon exertion thereon of the electromagnetic attracting force generated by said electromagnetic coil;
    a return spring disposed between said stationary core and said movable core for biasing said movable core in a direction opposite to said electromagnetic attracting force;
    a flow control valve body having an air inlet passage and an air outlet passage formed therein;
    a valve seat disposed in said flow control valve body so as to define said air inlet passage and said air outlet passage and having an air passing aperture formed therein to communicate said air inlet passage and said air outlet passage with each other;
    a valve slidably fitted over said movable core so as to contact with and separate from said air passing aperture for opening and closing an air flow between said air inlet passage and said air outlet passage;
    a spring for biasing said valve in a direction toward said valve seat relative to said movable core; and
    a stopper for restricting the amount of movement of said valve in the direction toward said valve seat, wherein said magnetic circuit is formed such that said electromagnetic attracting force is reduced in the region where the stop position of said movable core exceeds a certain position, wherein said stop position is the position where said electromagnetic attracting force and the biasing force of said return spring are balanced.

2. A flow control valve according to claim 1, wherein said movable core is formed to have an outer such shape that the surface area of said movable core adjacent to said yoke is reduced in the region where the stop position of said movable core exceeds said certain position.

3. A flow control valve according to claim 2, wherein said movable core is in the form of a hollow cylinder, a hollow pipe is fitted to a hollow portion of said movable core in such a manner as to extend toward the side of said flow control valve body, said valve is slidably fitted over said pipe, and a stopper is provided at the distal end of said pipe.

4. A flow control valve according to claim 2, wherein said movable core has a smaller-diameter portion formed integrally with its end on the side of said flow control valve body, a through hole is formed to penetrate said movable core in the axial direction, said valve is slidably fitted over said smaller-diameter portion, and a stopper is provided at the distal end of said smaller-diameter portion.

5. A flow control valve according to claim 1, wherein said movable core is in the form of a hollow cylinder, a hollow pipe is fitted to a hollow portion of said movable core in such a manner as to extend toward the side of said flow control valve body, said valve is slidably fitted over said pipe, and a stopper is provided at the distal end of said pipe.

6. A flow control valve according to claim 1, wherein said movable core has a smaller-diameter portion formed integrally with its end on the side of said flow control valve body, a through hole is formed to penetrate said movable core in the axial direction, said valve is slidably fitted over said smaller-diameter portion, and a stopper is provided at the distal end of said smaller-diameter portion.

7. A flow control valve according to claim 1, wherein said certain position is the position of the movable core with respect to the stationary core such that the distance therebetween is slightly larger than the minimum necessary to prevent the movable core from being attracted to the stationary core by residual magnetism.

8. A flow control valve according to claim 1, wherein said movable core includes a reduced diameter portion such that said reduced diameter portion starts to enter said yoke when said movable core first reaches said certain position which thereby reduces said electromagnetic attracting force generated by said electromagnetic coil on said movable core.

9. A flow control valve according to claim 1, wherein said electromagnetic coil includes a longitudinal axis along which said movable core is slidably disposed, and said yoke includes an end face perpendicular to said longitudinal axis.

10. A flow control valve according to claim 9, wherein said end face abuts said flow control valve body, and includes a hole through which said movable core is disposed.

11. A flow control valve according to claim 10, wherein said movable core includes a reduced diameter portion such that said reduced diameter portion starts to enter said hole in said end face when said movable core first reaches said certain position which thereby reduces said electromagnetic attracting force generated by said electromagnetic coil on said movable core.

12. A flow control valve according to claim 9, wherein said movable core includes a reduced diameter portion such that said reduced diameter portion is aligned with said hole in said end face when said movable core first reaches said certain position which thereby reduces said electromagnetic attracting force generated by said electromagnetic coil on said movable core.

13. A flow control valve according to claim 12, wherein the distance between the end of said movable core nearest the stationary core and said reduced diameter portion is shorter than the distance between the end of said stationary core closest to said movable core and said end face.

* * * * *